United States Patent [19]
Duckinghaus

[11] Patent Number: 5,615,594
[45] Date of Patent: Apr. 1, 1997

[54] HYDRAULIC CONTROL VALVE

[75] Inventor: Heinrich Duckinghaus, Bielefeld, Germany

[73] Assignee: Claas CHG Beschrankt Haftende Offene Handelsgesellschaft, Harsewinkel, Germany

[21] Appl. No.: 417,796

[22] Filed: Apr. 6, 1995

[51] Int. Cl.[6] .................................................. F15B 13/044
[52] U.S. Cl. ................... 91/433; 91/447; 91/459; 137/596.17; 251/129.14
[58] Field of Search ............................ 91/433, 447, 459; 137/116.3, 596.17; 251/129.14

[56] References Cited

U.S. PATENT DOCUMENTS

| | | | |
|---|---|---|---|
| 4,312,380 | 1/1982 | Leiber et al. | 137/596.17 X |
| 5,081,904 | 1/1992 | Horn et al. | 91/447 X |
| 5,282,329 | 2/1994 | Teranishi | 137/596.17 |
| 5,454,292 | 10/1995 | Oudelaar | 137/459 X |

*Primary Examiner*—Gerald A. Michalsky
*Attorney, Agent, or Firm*—Michael J. Striker

[57] ABSTRACT

A hydraulic control valve formed as a magnet valve with several connections and switching positions, comprises a housing provided with several connections, a valve slider displaceable in the housing, an electromagnet provided with an extensible plunger for controlling the valve slider, a valve seat provided in the housing, a ball movable between a closing position and an opening position with respect to the valve seat, a closing spring which urges the ball to the closing position. The ball is bringable by the valve slider to the opening position under the action of a force of the electromagnet, a valve body is firmly but exchangeably inserted in the valve housing so that the valve slider is guided in the valve body. The valve body accommodates the valve slider, the ball and a closing spring which presses the ball against the valve seat. A plurality of conduits are provided, including a pressure conduit, a control conduit and a consumer conduit. The opening which receives the control slider is bringable in flow communication with the pressure conduit, the consumer conduit and the control conduit. The valve slider is provided with a ring surface associated with the control conduit, so that a required pressure in the consumption conduit is determined by a magnitude of at least one of the ring surface, and a magnet force.

10 Claims, 4 Drawing Sheets

5,615,594

HYDRAULIC CONTROL VALVE

BACKGROUND OF THE INVENTION

The present invention relates to a hydraulic control valve formed as a magnet valve with several connections and several switching positions.

In particular, it relates to a hydraulic control valve of the above mentioned type, which has a housing provided with the connections and an electromagnet with displaceable plunger for controlling a valve slider, and which is provided with a valve seat and a ball movable by a closing spring in a closing position and also movable in an opening position by the control slider under the action of the electromagnet.

Such control valves are used conventionally for controlling hydraulic cylinder-piston units, for example for lifting and lowering aggregates of agricultural harvesting machines. These valves are known as multi-way valves with several switching positions. The above described valves which are generally satisfactory have however the disadvantage that the beginning of a lifting or lowering step as well as the end is performed in a strike-like manner. The thusly produced accelerating or braking forces are extremely high so that they cause correspondingly nigh loads of their components. Thereby vibration and shaking movements are produced, which are always undesirable.

Moreover, in the known control valve there is another disadvantage that the repair works are expensive. During a repair, the complete control valve must be changed. Because of these requirements it must always be guaranteed that the valve is leakage-free.

SUMMARY OF THE INVENTION

Accordingly, it is an object of the present invention to provide a hydraulic control valve which avoids the disadvantages of the prior art.

More particularly, it is an object of the present invention to provide a hydraulic control valve which is formed so that the components needed for its operation are exchangeable in a simple manner, and also it is guaranteed that the acceleration of braking of the aggregate to be moved is not performed in an impact-like manner, but instead softly.

In keeping with these objects and with others which will become apparent hereinafter, one feature of the present invention resides, briefly stated, in a hydraulic control valve in which the valve slider is guided in a valve body which is firmly and however exchangeably inserted in the housing, the valve has an opening provided for receiving the valve slider and accommodating a valve seat, a ball and a closing spring which presses the ball against the valve seat, the opening which receives the valve slider is bringable in a flow communication with a pressure conduit, a consumer conduit and a control conduit, and the valve slider is provided with a ring surface associated with the control conduit so that the required pressure in the consumer conduit is determined by the magnitude of the ring surface and/or magnetic force.

In the inventive control valve the valve body with the valve slider, the ball and the closing spring form a single structural unit. If for example the valve seat is no longer leakage-free, the structural unit can be removed from the housing of the control valve and exchanged by a properly operating one. Therefore a control valve is formed which can be considered as a new one.

Since the control slider has a ring surface, the pressure of oil acts with the open valve seat on the valve slider. This force acts against the magnetic force operative for opening of the valve seat. If the required is regulatable for example for providing a soft (progressive) control process, then with the change of the magnetic force, the position of the ring surface of the valve slider can be changed relative to the fixed control edge associated with the control opening. Therefore the volume stream flowing out of the control conduit is changed, and thereby the required pressure in the consumer conduit is changed as well. These properties of the control valve can be used for softly accelerating and softly braking of the aggregate or for regulating the required pressure in the consumer conduit.

When the required pressure is smaller than the applied pressure, the ring surface of the control slider and the magnetic force must be determined relative to one another so that after opening of the valve seat with full magnetic force, the force acting on the ring surface of the valve slider moves it against the magnetic force. Therefore the valve seat is closed a little, the ring surface of the valve slider correspondingly opens the cross-section of the control conduit, and a constant required pressure in the consumer conduit is adjusted automatically when the pressure in the supply conduit fluctuates.

If the ring surface of the valve slider and the magnetic force are determined relative to one another so that the magnet holds the valve slider against the full supply pressure in its switched position, the valve operates as a 3/2 way valve.

The control valve in accordance with the present invention is a valve with three connections and two switching positions. By coupling with a second valve, it can be converted to a valve with three or four connections and three switching positions.

For simple manufacture of the control valve as well as for simple exchange of the mentioned structural unit, it is advantageous when the valve body is cylindrical and inserted into a fitting opening of the valve housing. The valve body can be removed from the opening for exchanges. Moreover, the peripheral surfaces have great areas, so that the sealing is exceptionally good.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 3:
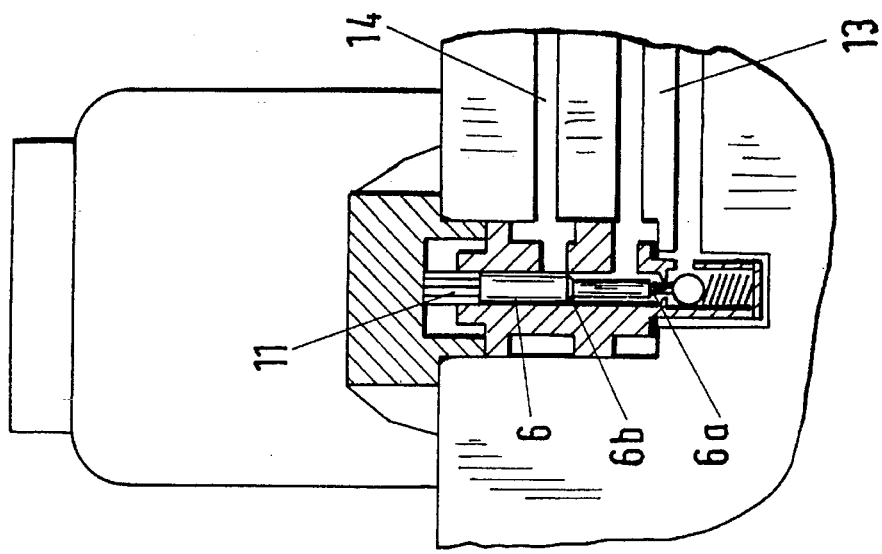
FIG. 3 is a view substantially corresponding to the view of FIG. 1 but showing an opening position of the control slider.

A control valve 1 shown in FIGS. 1–5 has a schematically shown valve housing 2, a valve body 4 firmly inserted in an opening 3, a valve slider 6 inserted in an opening 5 of the valve body 4, a ball 9 which is loaded by a closing spring 8 and operates for releasing and leakage-free closing of the valve seat 7 of the valve body 4, and an electromagnet 10 provided with an extendable and retractable plunger 11.

The opening 5 of the valve body 4 is in a flow communication with not shown conduits. The connections are not shown for the sake of simplicity. In the drawings, the pressure conduit connected with a hydraulic pump is identified with reference numeral 12, the consumer conduit leading to a consumer which is for example a hydraulic cylinder-piston unit is identified with reference numeral 13, and a control conduit leading to an oil tank is identified with reference numeral 14.

The opening 3 of the valve housing 2 is stepped. The region of the opening 3 which has the greatest diameter faces the electromagnet 10. In this region the valve body is inserted in a fitted way. The region of the valve body 4 which faces away from the electromagnet 10 has a smaller diameter. The valve seat 7 is located in a transition region. The pressure conduit 12 is connected with the region of the smaller diameter. The control conduit 14 faces the electromagnet 10 and the consumer conduit 13 is located therebetween. The region of the opening 3 which faces the electromagnet 10 is provided with an inner thread, in which an outer thread of a cup-shaped pressure ring 15 is inserted for fixing the valve body 4. The upper region of the pressure ring engages the opening 3. The sealing is performed by a sealing ring 16. A sealing disc 17 provides sealing of the transition region, in which the outer diameter of the valve housing 4 changes, to the ring surface of the step-shaped opening 3 of the valve housing.

The valve body 4 in the connection region for the consumer conduit 13 and the control conduit 14 is provided with circumferential ring grooves 18 and 19. As can be seen from the drawings, the remaining contact surfaces are relatively large, so that no further sealing means are required for sealing. The valve slider is offset in a stepped manner two times. The lower ring surface 6a facing the ball 9 is located in the region of the consumer conduit 113, while the upper ring surface 6b is located in the region of the control conduit 14. This ring surface 6b is associated with a control edge 18a of the valve body 14.

Figure 1:
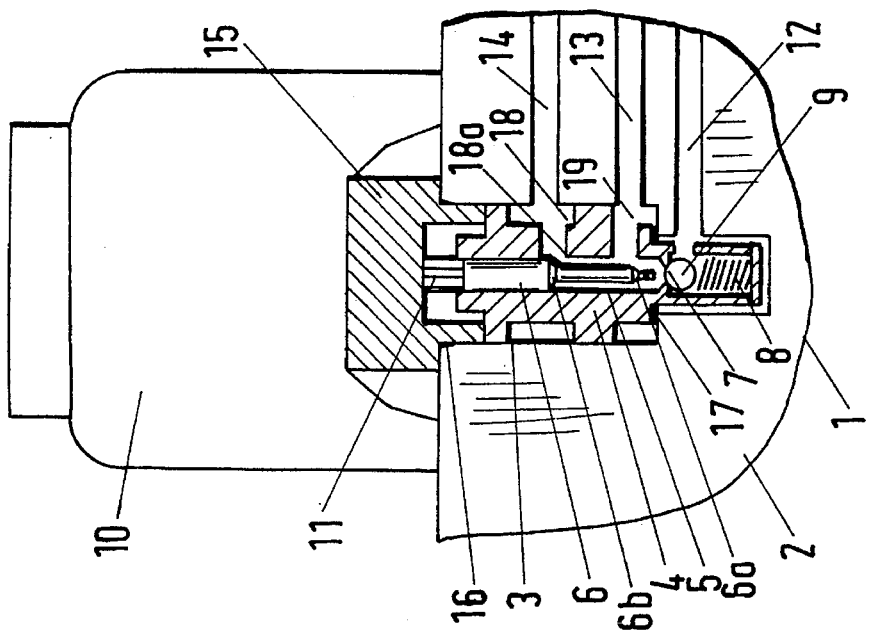
FIG. 1 is a view showing a hydraulic control valve in a closing position of a valve seat, in a partial section.

In the showing of FIG. 1 the electromagnet 10 is currentless. The closing spring 8 presses the ball against the valve seat, so that the seat is leakage free. In the pressure conduit 12 the oil is under the pump pressure. The consumption conduit 13 and the control conduit 14 are pressureless since in this condition no oil flows. When the electromagnet 10 is loaded with the maximum voltage, the plunger 11 is completely extracted and displaces the valve slider 6 to its lower end position shown in FIG. 3. The ring surface 6b extends then to the control edge 18a so that no oil is discharged through the control conduit 14. This condition however lasts only for a short time since the pressure oil flowing into the valve seat 7 applies a pressure which is opposite to the magnetic force on the ring surface 6b of the valve slider 6. The valve slider 6 is displaced in direction toward the electromagnet 10 so that between the ring surface 6b and the control edge 18a a pressure current gap is produced, so that oil can be discharged through the control conduit 14. Thereby in the consumer conduit 13 with a constant pressure in the pressure conduit 12, a predetermined required pressure is provided. This required pressure can be determined by the magnitude of the ring surface when for example the hydraulic control valve 1 is used for such an aggregate in which a constant required pressure/smaller pump pressure is needed or sufficient.

Figure 2:
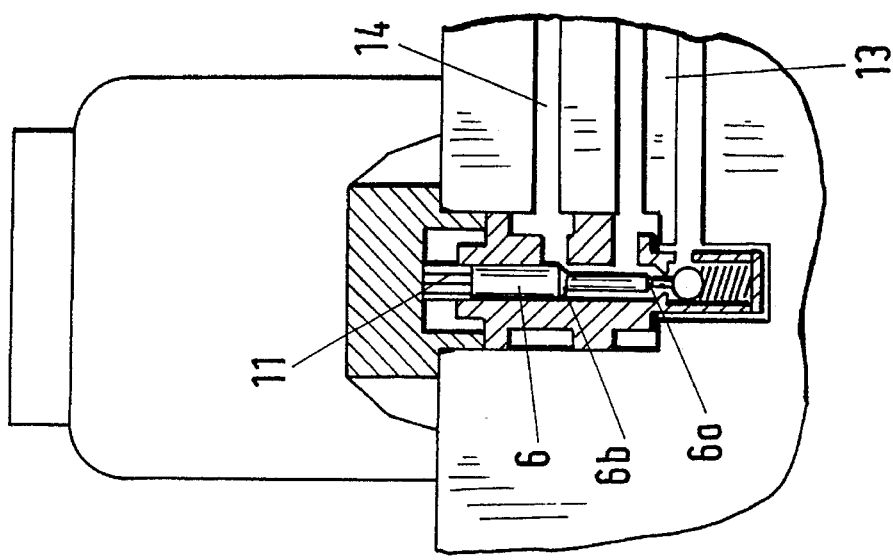
FIG. 2 is a view corresponding to the view of FIG. 1 but showing a regulating position of the valve slider.

If, however, for controlling or regulating process a change of the required pressure is needed, the electromagnet 10 can be excited by a voltage which is smaller when compared with the maximum voltage. Since the magnetic force drops, the valve slider 10 is displaced further in direction toward the electromagnet 10, so that the throughflow cross-section between the control edge 18a and the ring surface 6b is greater. Since correspondingly greater volume stream discharges through the control conduit 14, the pressure in the consumer conduit 13 drops. The regulating position of the control valve 1 is shown in FIG. 2. It can be seen that due to change in the magnetic force required pressure in the consumer conduit 13 can be regulated. So a lifting device can be softly lifted and lowered. Moreover, for the drive of a rotating aggregate of a harvester thresher, a predetermined, constant pressure is produced. Many applications can be seen in agricultural harvesting machines.

When after a certain time it is required, for example due to a leak of the valve seat, to exchange the valve body 3 with the valve slider 6, the closing spring 8 and the ball 9, the pressure ring 15 must be unscrewed. The above mentioned components can be withdrawn from the opening 3 as a structural unit and replaced with a new unit.

Figure 4:
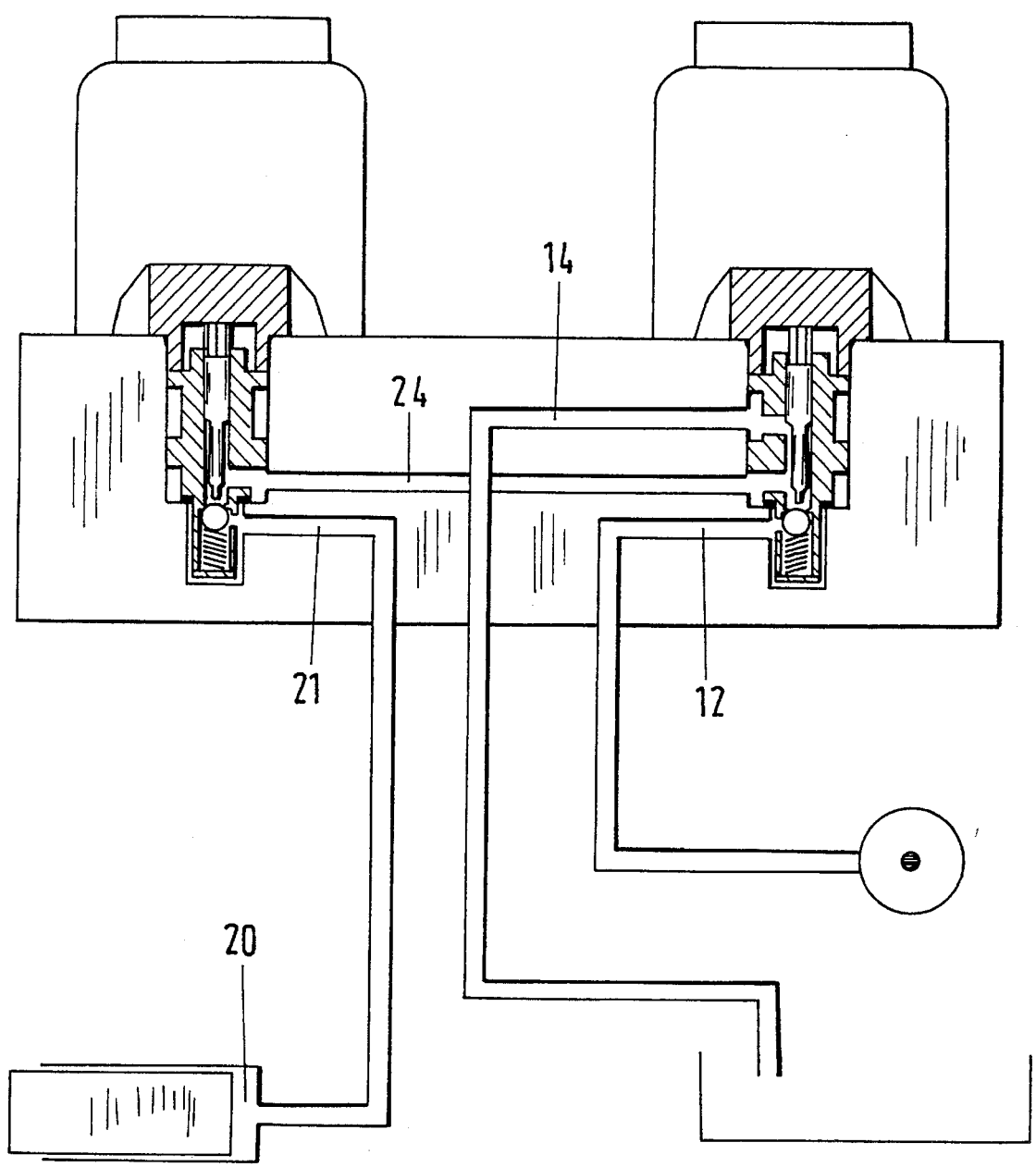
FIG. 4 is a view showing a combination of two control valves of FIG. 1 to form a valve with three connections and three switching positions.

The embodiment of FIG. 4 shows the control valve 1 as a multi-way valve with three connections and three switching possibilities. Two openings 3 are arranged in the valve housing 2. A structural unit which includes the above mentioned valve body 4 is mounted in each opening 3. The construction corresponds to the control valve of FIGS. 1–3. Therefore the same reference numerals are utilized for the same parts. Both valve seats 7 are again oil free. Both openings 5 of the valve body 4 are connected by a connecting conduit 24. A single-acting hydraulic cylinder-piston unit 20 is connected with the conduit 21 of the left valve body 4. The consumer conduit 21 is a pressure conduit with only one valve body 4 of FIGS. 1–3. The oil flows from the pressure conduit 12 of the right valve body 4 through the valve seat 7 via the connecting conduit 24 to the left valve body 4 and from there through the valve seat 7 of the left valve body 4 through a consumer conduit 21 leading to the hydraulic cylinder-piston unit 20. The pressure to the cylinder-piston unit can be regulated because of the regulability of the right valve body 4. The arrangement in accordance with FIG. 4 is suitable for example for controlling the lifting cylinder of a lifting device which is lowered under the action of its own weight, or for controlling the variator of a harvester thresher-threshing dream. In the left valve body 4, there is no control conduit 14. It acts via the electromagnet 10 as a blockable check valve.

Figure 5:
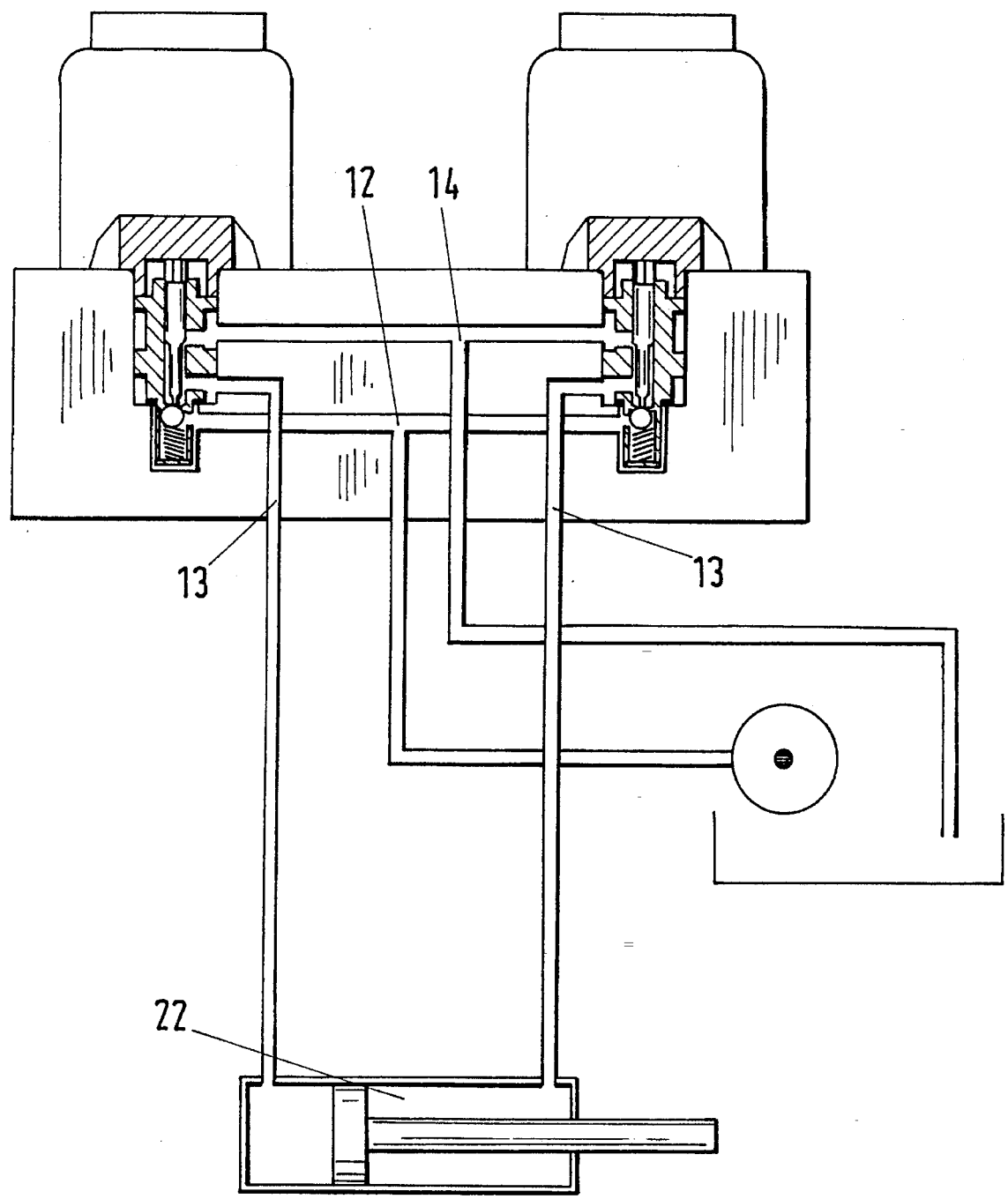
FIG. 5 is a view showing a combination of two control valves of FIG. 1 to form a valve with four connections and three switching positions.

In the embodiment of FIG. 5 both valve bodies 4 are connected by the control conduit 14 and the pressure conduit 12. A double-acting hydraulic cylinder-piston unit 22 is connected with the consumer conduit 13, and its piston can be selectively loaded from the left or from the right valve body 4. For this purpose either the left or the right valve seat is open, and the correspondingly other is closed by a spring force so that the displaced oil can discharge through the corresponding control conduit 14 to the oil tank. Both valve seats 7 are leakage free. From FIG. 5 it can be seen that it is possible to provide four connections and three switching positions. Further, an aggregate connected with the hydraulic cylinder-piston unit 22 can move freely, or in other words only the friction forceps must be overcome since the displaced oil can be discharged or again aspirated through the left or right valve body. The system of FIG. 5 is suitable for example for controlling the grinding device of a chopper drum.

Figure 6:
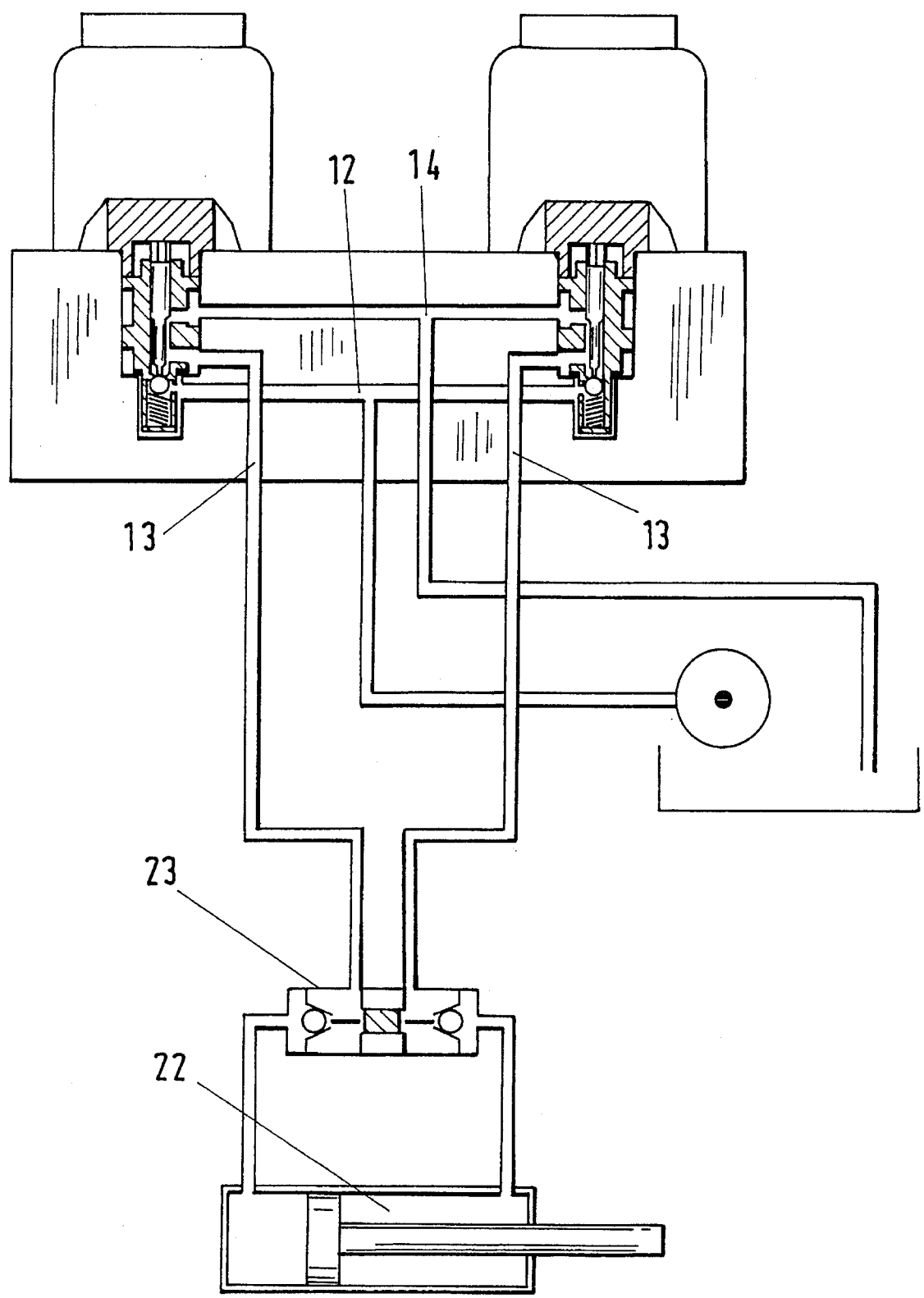
FIG. 6 is a view substantially corresponding to the view of FIG. 5 and additionally provided with a blocking unit.

When needed, a blocking unit 23 can be mounted in the system to prevent the oil flow. The system in FIG. 6 is suitable for example for drive control of a grain tank discharge pipe of a harvester thresher.

It will be understood that each of the elements described above, or two or more together, may also find a useful application in other types of constructions differing from the types described above.

While the invention has been illustrated and described as embodied in a hydraulic control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic control valve formed as a magnet valve with several connections and switching positions, comprising a housing provided with several connections; a valve slider displaceable in said housing; an electromagnet provided with an extensible plunger for controlling said valve slider; a valve seat provided in said housing; a ball movable between a closing position and an opening position with respect to said valve seat; a closing spring which urges said ball to said closing position, said ball is bringable by said valve slider to said opening position under the action of a force of said electromagnet; a valve body firmly but exchangeably inserted in said valve housing and having an opening so that said valve slider is received in said opening and guided in said valve body, said valve body accommodating said valve slider, said ball and said closing spring which presses said ball against said valve seat; a plurality of conduits including a pressure conduit, a control conduit and a consumer conduit, said opening which receives said control slider being bringable in flow communication with said pressure conduit, said consumer conduit and said control conduit, said valve slider being provided with a ring surface associated with said control conduit, so that a required pressure in said consumer conduit is determined by a magnitude of at least one of said ring surface and a magnet force of said electromagnet, said electromagnet and said control slider being formed so that by changing a magnetic force of said electromagnet, said control slider is bringable to a regulating position in which said ring surface of said valve slider is adjustable to a control edge, so that the quantity oil discharging through said control conduit regulates a required pressure in said consumer conduits.

2. A hydraulic control valve as defined in claim 1, wherein said electromagnet and said valve slider are formed so that with a full magnetic force of said electromagnet and correspondingly formed said ring surface of said valve slider due to a pressure in said consumer conduit said conduits are brought into a flow connection.

3. A hydraulic control valve as defined in claim 1, wherein said valve slider is cylindrical, said housing having an opening in which said cylindrical valve slider is fitted.

4. A hydraulic control valve as defined in claim 1, wherein said pressure conduit is provided with a connection at a side facing away from said electromagnet, said control conduit being provided with a connection at a side facing said electromagnet, said consumer conduit having a connection located between two first mentioned connections.

5. A hydraulic control valve as defined in claim 1, wherein said valve body is provided with a control edge for controlling a required pressure in said consumer conduit, said control edge being associated with said control conduit and said ring surface of said control slider.

6. A hydraulic control valve as defined in claim 1; and further comprising a second valve body associated with a valve slider, a valve seat, a closing spring, a ball and an electromagnet, said both valve bodies being arranged in said valve housing, connected with one another by a conduit, and forming each a structural unit.

7. A hydraulic control valve as defined in claim 6, wherein said connecting conduit is formed by said consumer conduit; and further comprising a consumer which is connected with a pressure conduit of one of said structural units.

8. A hydraulic control valve as defined in claim 7, wherein said consumer is a single-acting hydraulic cylinder-piston unit.

9. A hydraulic control valve as defined in claim 1; and further comprising a consumer which is loadable from both sides and connected with said consumer conduit.

10. A hydraulic control valve as defined in claim 9, wherein said consumer is formed as a double-acting cylinder-piston unit.

* * * * *